United States Patent
Weh et al.

(10) Patent No.: US 7,494,158 B2
(45) Date of Patent: Feb. 24, 2009

(54) CONNECTING COUPLING WITH A SLIDING SLEEVE AND COLLET CHUCKS

(76) Inventors: Erwin Weh, Siemensstrasse 5, 89257, Illertissen (DE); Wolfgang Weh, Siemensstrasse 5, 89257, Illertissen (DE)

( * ) Notice: Subject to any disclaimer, the term of this patent is extended or adjusted under 35 U.S.C. 154(b) by 0 days.

(21) Appl. No.: 10/506,361

(22) PCT Filed: Mar. 1, 2003

(86) PCT No.: PCT/EP03/02112

§ 371 (c)(1),
(2), (4) Date: May 16, 2005

(87) PCT Pub. No.: WO03/074921

PCT Pub. Date: Sep. 12, 2003

(65) Prior Publication Data

US 2005/0212289 A1     Sep. 29, 2005

(30) Foreign Application Priority Data

Mar. 2, 2002   (DE) .............................. 202 03 246 U

(51) Int. Cl.
*F16L 21/06* (2006.01)
*F16L 37/04* (2006.01)

(52) U.S. Cl. ............................. 285/322; 285/33; 285/34; 285/308; 285/316; 285/317; 137/614.03; 137/614.04; 137/614.05

(58) Field of Classification Search ................ 285/308, 285/322, 323, 317, 318, 316, 23, 18, 33, 285/34, 35, 81, 87, 88, 883; 137/614.03, 137/614.04, 614.05; 403/298
See application file for complete search history.

(56) References Cited

U.S. PATENT DOCUMENTS

| | | | |
|---|---|---|---|
| 2,070,013 A * | 2/1937 | Krannak | 285/316 |
| 2,092,116 A | 9/1937 | Hansen | |
| 2,742,052 A | 4/1956 | McKee | |
| 3,077,330 A * | 2/1963 | Lampbear | 251/89.5 |
| 3,112,765 A | 12/1963 | Crissey et al. | |
| 3,240,520 A * | 3/1966 | Dailey et al. | 403/325 |
| 3,680,591 A | 8/1972 | Vik | |
| 3,731,705 A | 5/1973 | Butler | |
| 4,109,686 A | 8/1978 | Phillips | |
| 4,181,150 A | 1/1980 | Maldavs | |
| 4,222,411 A | 9/1980 | Herzan et al. | |
| 4,339,023 A * | 7/1982 | Maycock | 192/70.25 |

(Continued)

FOREIGN PATENT DOCUMENTS

DE          819366 C     10/1951

(Continued)

*Primary Examiner*—James M Hewitt
*Assistant Examiner*—Jay R Ripley
(74) *Attorney, Agent, or Firm*—Knobbe Martens Olson & Bear LLP

(57) ABSTRACT

In order to provide a connecting coupling whose structure has increased stability and which is used for transmitting gaseous and/or liquid fluids, especially for filling the petrol tank of vehicles, comprising a sliding sleeve (18) which is used to lock collet chucks (15) above a connecting nipple, a guide sleeve (38) with longitudinal grooves is provided between the sliding sleeve (18) and the collet chucks (15). The collet chucks are guided inside the longitudinal grooves.

6 Claims, 2 Drawing Sheets

U.S. PATENT DOCUMENTS

| | | |
|---|---|---|
| 4,347,870 A | 9/1982 | Maldavs |
| 4,469,149 A | 9/1984 | Walkey et al. |
| 4,493,475 A | 1/1985 | Baird |
| 4,934,419 A | 6/1990 | Lamont et al. |
| 5,014,743 A | 5/1991 | Makishima |
| 5,080,132 A | 1/1992 | Manz et al. |
| 5,095,947 A | 3/1992 | Weh et al. |
| 5,156,198 A | 10/1992 | Hall |
| 5,249,612 A | 10/1993 | Parks et al. |
| 5,297,574 A | 3/1994 | Healy |
| 5,365,984 A | 11/1994 | Simpson et al. |
| 5,413,309 A | 5/1995 | Giesler |
| 5,464,042 A | 11/1995 | Haunhorst |
| 5,605,182 A | 2/1997 | Oberrecht et al. |
| 5,630,570 A * | 5/1997 | Lacroix et al. ............ 251/149.9 |
| 5,647,910 A * | 7/1997 | Brown ........................ 118/710 |
| 5,923,572 A | 7/1999 | Pollock |
| 6,035,894 A | 3/2000 | Weh et al. |
| 6,179,300 B1 * | 1/2001 | Baumann et al. ............ 279/19.4 |
| 6,202,383 B1 * | 3/2001 | Reiter ........................ 52/770 |
| 6,343,630 B1 | 2/2002 | Dubinsky |
| 6,394,150 B1 | 5/2002 | Haimovich et al. |
| 6,962,177 B1 | 11/2005 | McCommons |
| 2002/0069934 A1 | 6/2002 | Peattie |
| 2005/0161097 A1 | 7/2005 | Weh et al. |
| 2005/0205141 A1 | 9/2005 | Weh et al. |
| 2005/0212289 A1 | 9/2005 | Weh et al. |

FOREIGN PATENT DOCUMENTS

| | | |
|---|---|---|
| DE | 1185938 B | 1/1965 |
| DE | 1226904 B | 10/1966 |
| DE | 19834671 | 2/2000 |
| DE | 20317914 U1 | 12/2004 |
| EP | 0039977 | 11/1981 |
| EP | 0487844 | 6/1992 |
| FR | 1055252 A | 2/1954 |
| WO | WO 88/01601 A | 3/1988 |
| WO | WO 93/20378 | 10/1993 |
| WO | WO 98/04866 | 2/1998 |
| WO | WO 98/05898 | 2/1998 |
| WO | WO9902913 | 1/1999 |
| WO | WO 00/52378 A1 | 9/2000 |

* cited by examiner

CONNECTING COUPLING WITH A SLIDING SLEEVE AND COLLET CHUCKS

The invention relates to a connection coupling for the transfer of gaseous and/or liquid fluids, especially for filling the gas tanks of motor vehicles.

Such connection couplings are to ensure a secure and quickly connectable transfer of a fluid from a pressurized source, e.g. from a filling station to a vehicle. The particularly important aspect in this respect is the simple and secure ability to operate the same, so that even in case of filling and connection pressures of 200 bars and more, easy handling is ensured.

Such a connection coupling is described in WO 98/05898 of the applicant, with the quick-action connection coupling having a housing with a fluid inlet and a fluid outlet as well as several valves in order to ensure a secure sealing of the quick-action connection coupling until the complete establishment of the connection. Said valves are switched after the attachment of the quick-action connection coupling by twisting a control lever in a predetermined sequence, with the discharge valve being opened first by sliding the quick-action connection coupling onto a connection nipple, whereupon following further movement of the control lever the collet chucks acting as locking elements are closed and finally the inlet valve is opened. The control valve is in engagement via an eccentric shaft with the sliding sleeve for activating the collet chucks and with a sealing piston which also releases the fluid inlet after the performed connection of the connection coupling.

The stable bearing and secure guidance of the collet chucks is of high importance especially at high pressures because the entire connection force of the connection coupling is transmitted through the same.

Although the known connection coupling has proven its worth by its especially secure connection capabilities, it is still worthy of improvement with respect to its handling during connection and the adjustment to different pressure ranges such as for different types of gas.

The invention is accordingly based on the object of providing a connection coupling, especially a quick-action connection coupling of the kind mentioned above, which in combination with a stable configuration offers especially simple handling and connectivity.

This object is achieved by a connection coupling according to the features of claim 1. Preferred further developments of the invention are the subject matter of the dependent claims.

The proposed connection coupling is especially suitable for use in a quick-action connection coupling for refueling natural gas motor vehicles. An especially stable design is obtained because the collet chucks are securely guided even during the connection process in longitudinal grooves in the lateral circumferential direction and are thus not able or hardly able to yield tangentially or laterally during the connection process. As a result, any "oblique" application on the connection nipple or even any "bending" or damaging of the collet chucks can be prevented securely.

In particular, the collet chucks are inserted in the preferred embodiment into the longitudinal grooves with lateral fit, so that the same can be stabilized against tangential forces. Moreover, the collet chucks are well protected against soiling due to their slightly recessed position, leading to especially secure handling.

As a result of the centering incline integrated at the front end of the guide sleeve, a secure guidance is achieved during the connection process and a secure connection of the connection coupling is achieved. Easy handling is thus ensured, so that the connection coupling can also be connected by non-professionals. Moreover, the elements involved in the adjustment to a certain connection nipple can be exchanged quickly and easily in order to achieve a high amount of variability with optimal fit.

A scraper ring around a sealing piston is of separate special importance, so that any entrance of dirt into the connection nipple is prevented in the case of any soiling of the connection nipple.

An embodiment of the invention is now explained and described in closer detail by reference to the enclosed drawings, wherein.

Figure 1:
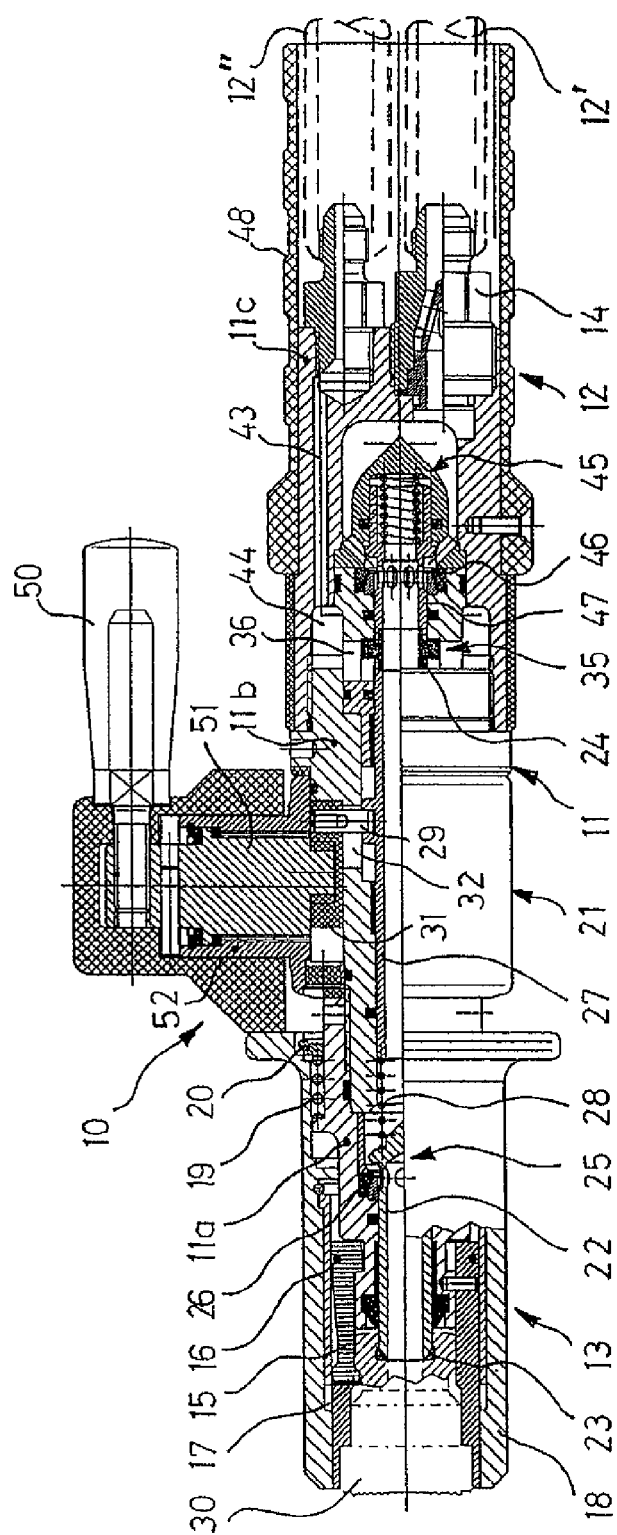
FIG. 1 shows a side view of a connection coupling which is shown in a longitudinal semi-sectional view and in the position connected to a connection nipple.

FIG. 1 shows a preferred embodiment of a connection coupling 10 in the form of a so-called quick-action connection coupling which is coupled to a connection nipple indicated in this case on the left side. The connection coupling 10 comprises a tubular housing 11 with several mutually screwed-down housing parts 11a, 11b and 11c, with the right housing part 11c being used as the inlet region 12 and the left region as outlet 13 for the forwarding of the fluid to be transmitted to the connection nipple 30. A switch unit 21 with control lever 50 is arranged around the middle housing part 11b. The inlet region 12 comprises a connection adapter 14 to which a fluid line 12' can be connected via a thread for supplying the fluid to be transferred. The connection adapter 14 with an inserted filter sleeve can be configured in adjustment to the fluid to be transferred, especially to the desired feed pressure values, opening cross sections, etc.

Figure 2:
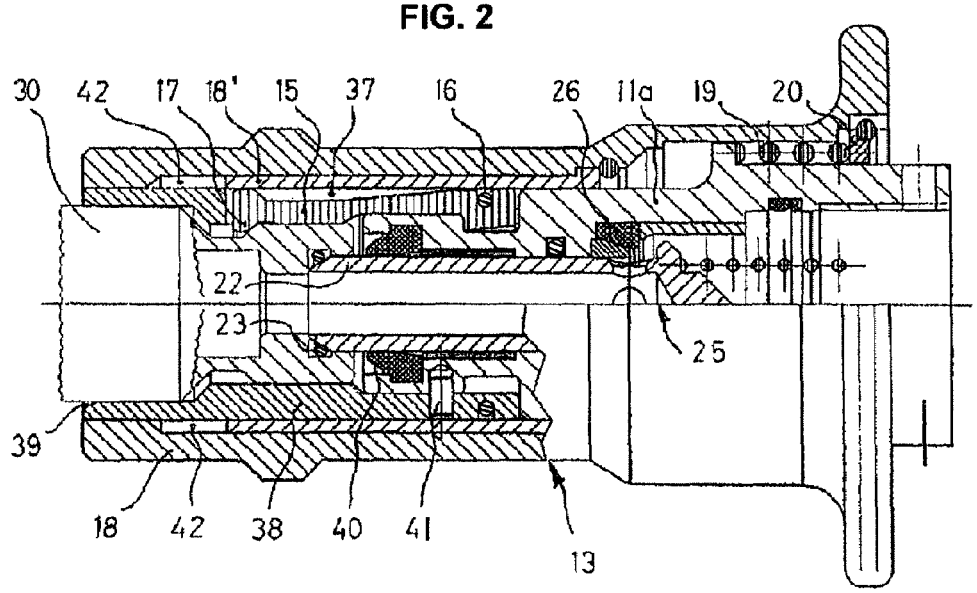
FIG. 2 shows a sectional view of an enlarged representation of the front part of the connection coupling according to FIG. 1.

In the region of outlet 13, several oblong collet chucks 15 are provided which are arranged in tubular form and which can be spread in a radially outward fashion shortly before the insertion on the connection nipple 30, with the outer ends then being capable of engaging in an annular groove 42 (cf. FIG. 2). The oblong collet chucks 15 are pre-tensioned by an annular spring 16, so that the collet chucks 15 can spread radially to the outside in an automatic manner. At the left outer end with inwardly crimped surfaces, the collet chucks 15 comprise interlocking engagement profiles 17 which are configured so as to correspond to a groove-like connecting profile section of the connection nipple 30. Its configuration is also described in closer detail in the aforementioned state of the art, so that any further explanation can be omitted. It merely needs to be mentioned for reasons of completeness that in the region of the outlet 13 a sealing piston 22 is inwardly guided which comprises at its front face side a conical sealing surface 23 for sitting close to a inner sealing ring of the connection nipple 30, so that the gaseous and/or liquid fluid which substantially flows along the central axis of the connection coupling 10 cannot escape to the outside.

An outside sliding sleeve 18 is provided around the collet chucks 15, which sliding sleeve is guided via a spacer sleeve 18' on the cylindrical outside jacket of the housing part 11a which is on the left side in this case and is pre-tensioned with a pressure spring 19 in the direction away from the connection nipple 30. The pressure spring 19 rests on a support ring 20 and thus pushes the sliding sleeve 18 towards a control lever 50 with an eccentric shaft 51.

A discharge valve 25 provided on the sealing piston 22 seals by means of a sealing ring as valve seat 26 relative to the sealing piston 22 in the closed position. The discharge valve 25 is pressurized by a pressure spring 28 which rests on a switch slide 27 towards the right side. This discharge valve 25 ensures that in the uncoupled position (not shown here) or shortly before the connection of the connection coupling 10 with the connection nipple 30 the fluid supplied through the connection adapter 14 cannot flow out. The switch slide 27 is displaced during the uncoupling of the connection coupling 10 from the connection nipple 30 by the switch unit 21 along the connection coupling axis and thus forms a ventilation valve 35 in combination with a sealing disk 24.

The ventilation valve 35 and the switch slide 27 are actuated by pivoting the control lever 50 because the eccentric shaft 51 is coupled with the switch slide 27, namely through the engagement of several bolts 29 which are displaceably inserted into axial slots 32 and are in connection with an outside ring slide 31. It comprises an annular groove into which the lower end of the eccentric shaft 51 engages. The entire switch unit 21 is rotatable about said ring slide 31 with the control lever 50.

As can be seen from the connection position of the connection coupling 10 as illustrated here, the engagement profile 17 of the collet chucks 15 is brought into engagement with the connection nipple 30 during the insertion on the connection nipple 30. By moving (pivoting by approx. 180°) the control lever 50 to the position as shown here, the sliding sleeve 18 is pushed over the collet chucks 15 and thus locked. The collet chucks 15 are guided in longitudinal grooves 37 (as shown in FIG. 2) which are incorporated in a guide sleeve 38 with perfect fit relative to the respective collet chucks 15. As a result, the collet chucks 15 are not able to yield or even be damaged in the case of a tangential or lateral force (e.g. in case the unit is applied in an "oblique" fashion), since the guide sleeve 38 grasps with its front end far beyond the connection nipple 30 and comprises a centering incline 39 there. In this way the collet chucks 15 are arranged relatively far within the housing and are therefore well protected.

When the pressure is applied (the beginning of the refueling process), the sealing piston 22 is displaced at first to the left (also under the action of spring 28). An especially important scraper ring 40 (cf. FIG. 2) is provided at the front circumference of the sealing piston 22, which ring securely prevents the entrance of dirt into the housing 11 during the axial movement of the sealing piston 22. When it sits close to the sealing surface 23, the valve seat 26 on the sealing piston 22 and thus the discharge valve 25 are opened under displacement of the sealing piston 22 to the right. In this process, the engagement profile 17 has already engaged on the correspondingly configured connecting profile section of the connection nipple 30. As a result of the axial movement of the sliding sleeve 18 and the thus linked spacer sleeve 18', the same engages over the radially outer ends of the collet chucks 15, so that they are held in an interlocked way on the connection nipple 30.

For releasing the connection coupling 10 and thus returning the connection position as shown here to the opening position, the sliding sleeve 18 is pushed back by the pressure spring 19 after the twisting of the control lever 50. After a short path, the collet chucks 15 can spread again in a radially outward manner and engage in the annular groove 42 which is then free due to the axial movement of the sliding sleeve 18/18'. Since the fluid pressure was interrupted beforehand (e.g. by closing a refueling valve), the sealing piston 22 is moreover displaced here and the discharge valve 25 on the valve seat 26 is closed.

The inlet region 12 further comprises an inlet valve 45 with an associated valve seat 46 centrally in the housing 11 or the housing part 11c of the connection coupling 10. The inlet valve 45 is also axially displaceable by the control lever 50 and its eccentric shaft 51 by coupling with the switch slide 27. Said switch slide 27 displaces a valve slide 47 of the inlet valve 45 to the opening position via the sealing disk 24 in the illustrated connection position, so that the fluid flowing in from the inlet region 12 can flow through the valve slide 47 and a pass-through in the sealing disk 24 and the tubular switch slide 27 towards the outlet 13.

When the connection coupling 10 is released, the switch slide 27 is displaced via bolt 29 to the left by twisting the control lever 50 (by approximately 180°), so that the sealing disk 24 can also detach from the sealing engagement. The pressure can thus decrease within the connection coupling 10 via the pass-through slots to a pressure compensation chamber 44. As was mentioned above, the ventilation valve 35 is opened by the eccentric shaft 51 and the switch slide 27 during the uncoupling of the connection coupling 10. As a result, any still applying pressure medium can thus flow via the pressure compensation chamber 44 to a ventilation bore 43 which extends parallel to the central fluid passage (through valves 45, 35 and 25) in the housing part 11c of the connection coupling 10. The ventilation bore 43 opens into a second line 12" which is preferably arranged as a return hose and is enclosed by a housing cap 48 like the feed line 12' in order to be used as a handle for easy handling. The ventilation line 12" and the fluid line 12' which is connected to adapter 14 thus always extend substantially parallel with respect to each other.

Figure 3:
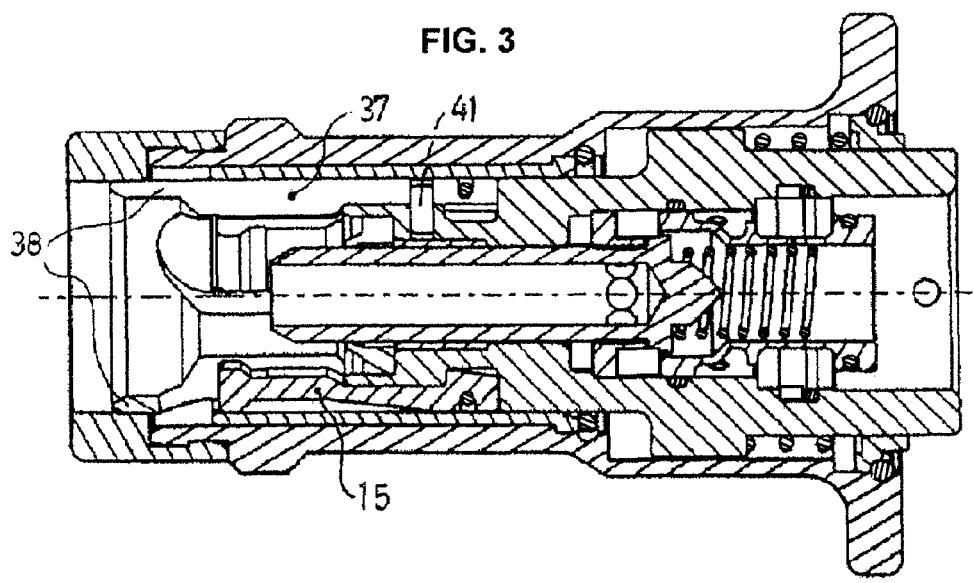
FIG. 3 shows another sectional view of an enlarged representation of the front part of the connection coupling according to FIG. 1.

FIG. 2 shows the principal configuration of the front part or outlet 13 of the connection coupling 10 on an enlarged scale. The representation shown in FIG. 3 omits a collet chuck 15 to offer more clarity concerning the longitudinal groove 37 in the guide sleeve 38, with the remaining configuration being unchanged with respect to FIG. 2. FIG. 2 especially shows the guidance of the collet chucks 15 (with generally three pieces in a 120° division usually being sufficient) within the longitudinal grooves 37 in the guide sleeve 38. The guide sleeve 38 is securely fastened with spring-type straight pins 41 to the front end of the housing part 11a, but it is easily exchangeable (like all other components such as the collet chucks 15 or spacer sleeves 18') in order to adjust the same to different connection nipples 13 or tanking pressures.

The invention claimed is:

1. A connection coupling for transferring fluids, the coupling having an inlet end, an outlet end, and a lumen therebetween, the coupling comprising:
   collet chucks, each collet chuck having an outer end;
   a sliding sleeve for locking the collet chucks onto a connection nipple, the sliding sleeve at least partially surrounding the collet chucks;
   a guide sleeve with longitudinal grooves in which the collet chucks are guided;
   a spacer sleeve at least partially surrounding the collet chucks and the guide sleeve, at least a portion of the spacer sleeve being disposed between the sliding sleeve and the collet chucks such that the collet chucks do not directly contact the sliding sleeve;
   a sealing piston disposed relative to the collet chucks so as to receive at least a portion of the connection nipple between the sealing piston and the collet chucks, the sealing piston forming at least a portion of the connection coupling lumen; and an annular groove formed between a shoulder of the sliding sleeve and the spacer sleeve and arranged radially outside of the guide sleeve, the groove receiving at least portion of the outer ends of the collet chucks at least when the collet chucks are in an uncoupled position.

2. A connection coupling according to claim 1, wherein the collet chucks are inserted into the longitudinal grooves.

3. A connection coupling according to claim 1, wherein the guide sleeve comprises a centering incline at the outlet end of the connection coupling.

4. A connection coupling according to claim 1, wherein the guide sleeve is exchangeably fastened with at least one straight pin to a front housing part.

5. A connection coupling, according to claim 1, wherein a scraper ring is held radially within the collet chucks around the sealing piston.

6. A connection coupling according to claim 1, wherein three collet chucks and three longitudinal grooves are provided in a 120° division in the guide sleeve.

* * * * *

UNITED STATES PATENT AND TRADEMARK OFFICE
CERTIFICATE OF CORRECTION

PATENT NO. : 7,494,158 B2
APPLICATION NO. : 10/506361
DATED : February 24, 2009
INVENTOR(S) : Weh et al.

It is certified that error appears in the above-identified patent and that said Letters Patent is hereby corrected as shown below:

In Col. 5, line 3, delete "at least" and insert -- at least a --, therefor.

Signed and Sealed this

Ninth Day of June, 2009

JOHN DOLL
*Acting Director of the United States Patent and Trademark Office*